(12) United States Patent
Zhu

(10) Patent No.: US 9,832,075 B2
(45) Date of Patent: Nov. 28, 2017

(54) TERMINAL MANAGEMENT METHOD AND APPARATUS

(71) Applicant: Huawei Device Co., LTD, Shenzhen (CN)

(72) Inventor: Zhe Zhu, Shenzhen (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 304 days.

(21) Appl. No.: 14/136,888

(22) Filed: Dec. 20, 2013

(65) Prior Publication Data

US 2014/0108637 A1   Apr. 17, 2014

Related U.S. Application Data

(63) Continuation of application No. PCT/CN2012/076478, filed on Jun. 5, 2012.

(30) Foreign Application Priority Data

Jun. 22, 2011   (CN) .......................... 2011 1 0169708

(51) Int. Cl.
H04L 12/24 (2006.01)
H04L 29/08 (2006.01)
(Continued)

(52) U.S. Cl.
CPC .......... *H04L 41/0893* (2013.01); *H04L 41/24* (2013.01); *H04L 67/125* (2013.01);
(Continued)

(58) Field of Classification Search
CPC . H04L 7/00; H04L 7/004; H04L 12/00; H04L 12/24; H04L 12/26–12/2605;
(Continued)

(56) References Cited

U.S. PATENT DOCUMENTS 6,662,205 B1 * 12/2003 Bereiter ................ H04L 41/042 709/201
7,924,853 B1 * 4/2011 Buller .................. H04Q 3/0045 370/230

(Continued)

FOREIGN PATENT DOCUMENTS

CN         1859177 A    11/2006
CN       101635895 A     1/2010
(Continued)

OTHER PUBLICATIONS

GwMo Requirements, Open Mobile Alliance, Candidate Version 1.0, Aug. 31, 2010.*
(Continued)

*Primary Examiner* — Tauqir Hussain
*Assistant Examiner* — Boris Grijalva Lobos
(74) *Attorney, Agent, or Firm* — Slater Matsil, LLP

(57) ABSTRACT

In terminal management method, a server sends operation information for performing a management operation on a target terminal to a gateway. The operation information carries a return format of an execution result of an operation command for performing the management operation on the target terminal. After receiving an operation command execution result sent by the target terminal, of the operation command and if there is an indication of a return format for the operation command execution result, the gateway processes the operation command execution result according to the indicated return format of the operation command execution result to obtain an operation command execution result conforming to the return format. The operation command execution result conforming to the return format is sent to the server.

13 Claims, 11 Drawing Sheets

(51) Int. Cl.
*H04W 4/00* (2009.01)
*H04W 4/18* (2009.01)

(52) U.S. Cl.
CPC ........... *H04W 4/001* (2013.01); *H04L 41/069* (2013.01); *H04W 4/18* (2013.01)

(58) Field of Classification Search
CPC .. H04L 12/2615; H04L 41/08–41/0806; H04L 41/0823; H04L 41/085; H04L 43/00; H04L 43/02; H04L 67/00; H04L 67/14; H04L 67/28; H04L 67/2833; H04L 5/00; H04L 5/003–5/0096; H04L 29/00–29/0602; H04L 29/08; H04L 29/08099; H04L 29/08576; H04L 41/00–41/0233; H04L 41/0273–41/0286; H04L 41/06; H04L 41/0604; H04L 41/0866–41/0873; H04L 41/0893; H04L 41/12; H04L 41/24
See application file for complete search history.

(56) References Cited

U.S. PATENT DOCUMENTS

| | | | | |
|---|---|---|---|---|
| 8,001,231 | B2* | 8/2011 | He | H04L 41/0681 709/223 |
| 8,024,450 | B1* | 9/2011 | Shiyafetdinov | G06F 9/5044 370/401 |
| 8,078,712 | B2* | 12/2011 | DeHaan | H04L 41/0803 370/238 |
| 8,713,155 | B2* | 4/2014 | Jin | H04L 41/04 709/223 |
| 8,752,006 | B1* | 6/2014 | Tolle | G06F 8/30 717/106 |
| 8,908,562 | B2* | 12/2014 | Zhang | H04W 4/005 370/254 |
| 2007/0189190 | A1* | 8/2007 | Feng | H04L 29/12518 370/254 |
| 2008/0127190 | A1 | 5/2008 | Shu et al. | |
| 2008/0215668 | A1* | 9/2008 | Hu | H04L 41/0806 709/202 |
| 2009/0204578 | A1 | 8/2009 | Dang | |
| 2010/0087179 | A1* | 4/2010 | Makavy | H04L 67/36 455/418 |
| 2010/0100972 | A1* | 4/2010 | Lemieux | G06F 21/57 726/34 |
| 2010/0149974 | A1* | 6/2010 | Ohtsu | H04L 65/1046 370/230 |
| 2011/0238806 | A1* | 9/2011 | Bhat | H04L 29/12566 709/223 |
| 2011/0268128 | A1* | 11/2011 | Aberg | H04L 12/24 370/401 |

FOREIGN PATENT DOCUMENTS

| | | |
|---|---|---|
| CN | 101882161 A | 11/2010 |
| KR | 100661006 B1 | 12/2006 |
| KR | 100818962 B1 | 4/2008 |

OTHER PUBLICATIONS

OMA Device Management Overview, Peter Thomson, Jun. 13, 2010.*
Extended European Search Report received in Application No. 12802233.2-1856 dated Oct. 28, 2013, 5 pages.
Gateway Management Object Technical Specification, Draft Version 1.0—Jun. 17, 2011, Open Mobile Alliance, OMA-TS-GwMO-V1_0-20110617-D, 51 pages.
Gateway Management Object Technical Specification, Draft Version 1.0—Jun. 17, 2011, Open Mobile Alliance, OMA-TS-GwMO-V1_0-20110617-D, 54 pages.
International Search Report and Written Opinion received in Application No. PCT/CN2012/076478 dated Sep. 20, 2012, 12 pages.

* cited by examiner

TERMINAL MANAGEMENT METHOD AND APPARATUS

CROSS-REFERENCE TO RELATED APPLICATIONS

This application is a continuation of International Application No. PCT/CN2012/076478, filed on Jun. 5, 2012, which claims priority to Chinese Patent Application No. 201110169708.6, filed with the Chinese Patent Office on Jun. 22, 2011, both of which are incorporated by reference in their entireties.

TECHNICAL FIELD

The present invention relates to the field of communications, and in particular, to a terminal management method and apparatus.

BACKGROUND

OMA (open mobile architecture) DM (device management) V1.3 (hereinafter referred to as a DM specification for short) is the unified specification of device management formulated by the OMA DM WG. A DM system provides a low-cost solution used for a third party to manage and set environment and configuration information of a terminal device, so as to solve the problems during the use of these devices, for example performing operations such as installing and upgrading the software and firmware in an OTA (over the air, wireless network) mode, and to provide more humanized and personalized service and improve user experience. The DM system includes a DM Client (DM client) in the terminal device, a device management tree stored in the terminal device, and a DM server. The DM client is configured to explain and execute a management command delivered by the DM server, the device management tree can be regarded as an interface for the DM server to manage the terminal device, and the DM server communicates with the DM client in the terminal device through a DM protocol to manage the terminal device.

For the convenience of managing, by the DM server, the DM client, in the prior art, a GW (gateway) is added between the DM server and the DM client to form GwMO architecture. The GwMO architecture describes the technology for a DM management server to manage an intranet terminal through the gateway. The DM server, the gateway, and the terminal all conforms to the OMA DM specification. For different management scenarios and management policies, the protocol defines three work modes of the gateway: a transparent mode (Transparent Mode), a proxy mode (Proxy Mode), and an adaptation mode (Adaptation Mode). After the DM Gateway gateway device is introduced, if the gateway works in the proxy mode, that is, a DM session is kept between the DM server (DMS) and the DM gateway (DM Gateway), and a DM session is kept between the DM gateway (DM Gateway) and the device, and a device management command is simultaneously sent to one or more terminals, a Fanout mechanism needs to be used. A Fanout MO is saved in the DM gateway.

During the implementation of terminal management, the prior art at least has the following problems. The number of results returned by the terminals through the gateway is quite large, no unified expression format exists for each result, and the server needs to process the terminal results one by one, so that the efficiency of the server is quite low.

SUMMARY OF THE INVENTION

Embodiments of the present invention provide a terminal management method and apparatus, which improve the efficiency for a server to process an operation command execution result of a terminal.

To achieve the foregoing objectives, the embodiments of the present invention adopt the following technical solutions.

A terminal management method includes sending operation information for performing a management operation on a target terminal to a gateway. The operation information carries a return format of an execution result of an operation command for performing the management operation on the target terminal so that the gateway returns the operation command execution result returned by the target terminal in the return format to a server. The return format is indication information indicating how the gateway groups operation command execution results of target terminals. An operation command execution result is received. This result is sent by the gateway and conforms to the return format.

A terminal management method includes receiving operation information, sent by a server, for performing a management operation on a target terminal. A corresponding operation command is sent to the target terminal according to the operation information. An operation command execution result of the operation command sent by the target terminal is if there is an indication of a return format for the operation command execution result. The operation command execution result is processed according to the indicated return format of the operation command execution result to obtain an operation command execution result conforming to the return format. The operation command execution result conforming to the return format is sent to the server.

A server, includes a first sending unit, which is configured to send operation information for performing a management operation on a target terminal to a gateway. The operation information carries a return format of an execution result of an operation command for performing the management operation on the target terminal, so that the gateway returns the operation command execution result, returned by the target terminal, in the return format to the server. The return format is indication information indicating how the gateway groups operation command execution results of target terminals. A first receiving unit is configured to receive an operation command execution result which is sent by the gateway and conforms to the return format.

A gateway includes a first receiving unit, which is configured to receive operation information, sent by a server, for performing a management operation on a target terminal. A first sending unit is configured to send a corresponding operation command to the target terminal according to the operation information received by the first receiving unit. A second receiving unit is configured to receive an operation command execution result sent by the target terminal, of the operation command. An operation unit is configured to, if there is an indication of a return format for the operation command execution result, process the operation command execution result received by the second receiving unit according to the indicated return format of the operation command execution result, to obtain an operation command execution result conforming to the return format. A second sending unit is configured to send the operation command execution result obtained by the operation unit and conforming to the return format to the server.

In the embodiments of the present invention, when the operation information for performing the management operation on the target terminal is sent to the gateway, the operation information carries the return format of the execution result of the operation command for performing the management operation on the target terminal; after the gateway receives the operation command execution result sent by the target terminal, and when the operation command execution result has the indication of the return format, the operation command execution result is processed according to the return format to obtain the operation command execution result conforming to the return format, and the operation command execution result conforming to the return format is sent to the server, so that when processing the operation command execution result, the server can process the same kind of execution results in bulk according to the return format of the operation command execution result. Compared with the prior art that the server processes the execution results one by one, the present invention improves the efficiency for the server to process the operation command execution result of the terminal.

BRIEF DESCRIPTION OF THE DRAWINGS

Apparently, the accompanying drawings in the following descriptions show merely some embodiments of the present invention, and persons of ordinary skill in the art may still derive other drawings from the accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
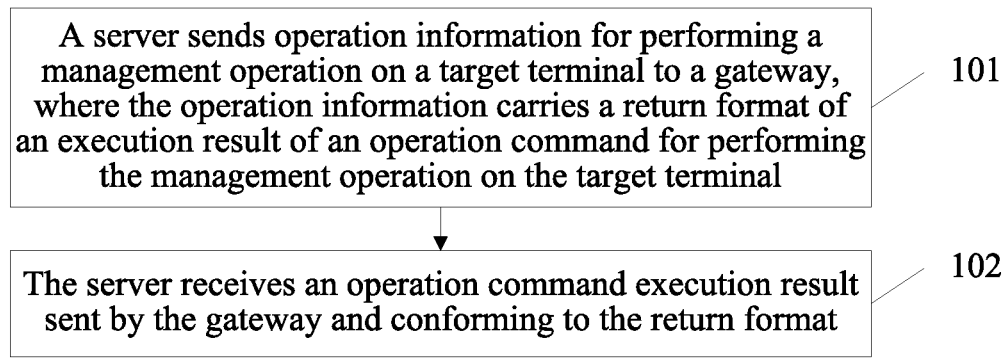
FIG. 1 is a flow chart of a terminal management method according to an embodiment of the present invention.

An embodiment of the present invention provides a terminal management method. The method is a server side method. As shown in FIG. 1, the method includes the following steps.

101: A server sends operation information for performing a management operation on a target terminal to a gateway, where the operation information carries a return format of an execution result of an operation command for performing the management operation on the target terminal, so that the gateway returns the operation command execution result, returned by the target terminal, in the return format to the server, and the return format is indication information indicating how the gateway groups operation command execution results of target terminals.

The return format of the operation command execution result includes the type and the quantity limitation of the return format. The type of the return format includes: a loose grouping manner and a strict matching grouping manner, which may be represented by parameters and the parameters may be Profile parameters. The return format of the operation command execution result may be specifically defined as follows: "1" represents the loose grouping manner and "2" represents the strict matching grouping manner. The quantity limitation of the return format includes: returning an execution result of one operation command, returning execution results of two operation commands and returning execution results of more than two operation commands, which may also be defined through parameters, for example, ResGroup parameters. Specifically, "1" represents returning an execution result of one operation command, "2" represents returning execution results of two operation commands, and "3" represents execution results of more than two operation commands.

The operation information carries the return format of the execution result of the operation command for performing the management operation on the target terminal, where the return format may be represented in a form of parameters, which is not limited by the embodiment of the present invention, and a corresponding return format may also be directly pointed out. When the return format is represented in the form of parameters, and for example, when it is indicated that the return format of the operation command execution result is returning execution results of two operation commands in the loose grouping manner, the parameters may be set to "Profile=1 AND ResGroup=1" or "Profile=2 AND CmdID=123 AND CmdID=002", where the parameter CmdID represents returning an operation result when CmdID is n, for example, returning operation results when CmdID=123 and 002.

It should be noted that, when the operation information for performing the management operation on the target terminal is sent to the gateway, the return format of the execution result of the operation command for performing the management operation on the target terminal may be carried, or the return format of the execution result of the operation command for performing the management operation on the target terminal may not be carried, which are not limited by the embodiment of the present invention and are set according to requirements of a user. However, in order for the gateway to return the operation command execution result returned by the target terminal to the server according to the return format, the operation information must carry the return format of the execution result of the operation command for performing the management operation on the target terminal.

102: The server receives an operation command execution result which is sent by the gateway and conforms to the return format.

Figure 2:
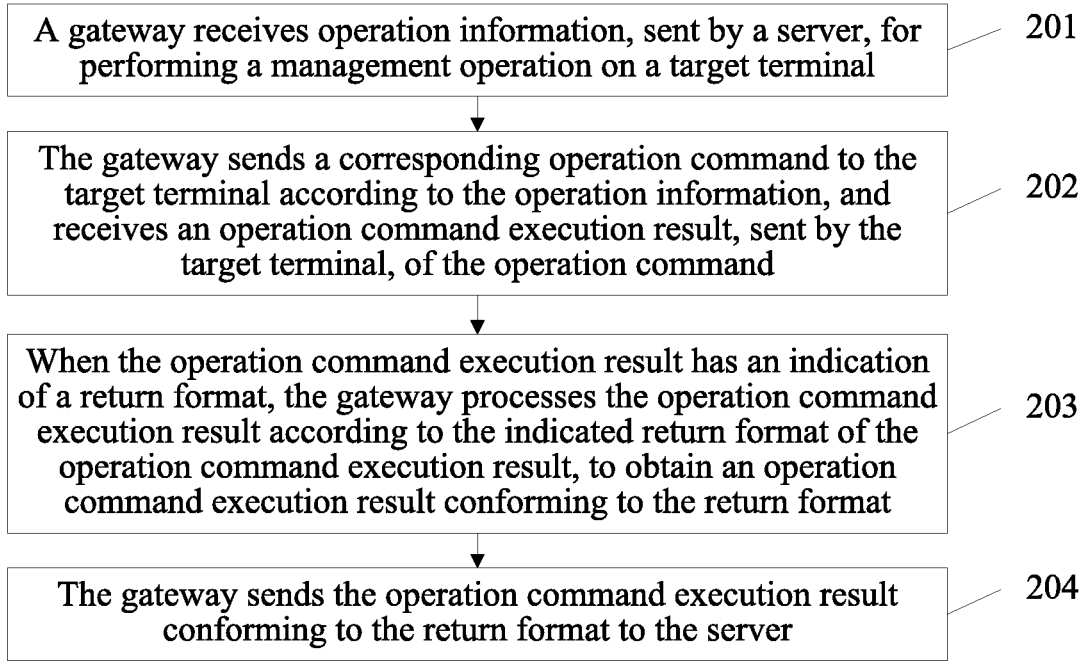
FIG. 2 is a flow chart of another terminal management method according to an embodiment of the present invention.

Corresponding to the terminal management method, the embodiment of the present invention further provides a terminal management method. The method is a gateway side method. As shown in FIG. 2, the method includes the following steps.

201: A gateway receives operation information, sent by a server, for performing a management operation on a target terminal.

The operation information may carry a return format of an execution result of an operation command for performing the management operation on the target terminal, or may not carry a return format of an execution result of an operation command for performing the management operation on the target terminal, which are not limited by the embodiment of the present invention and are set according to requirements of a user. When the user needs to return, according to a preset return format, the operation command execution result returned by the target terminal, the operation information carries the return format of the execution result of the operation command for performing the management operation on the target terminal.

Figure 3:
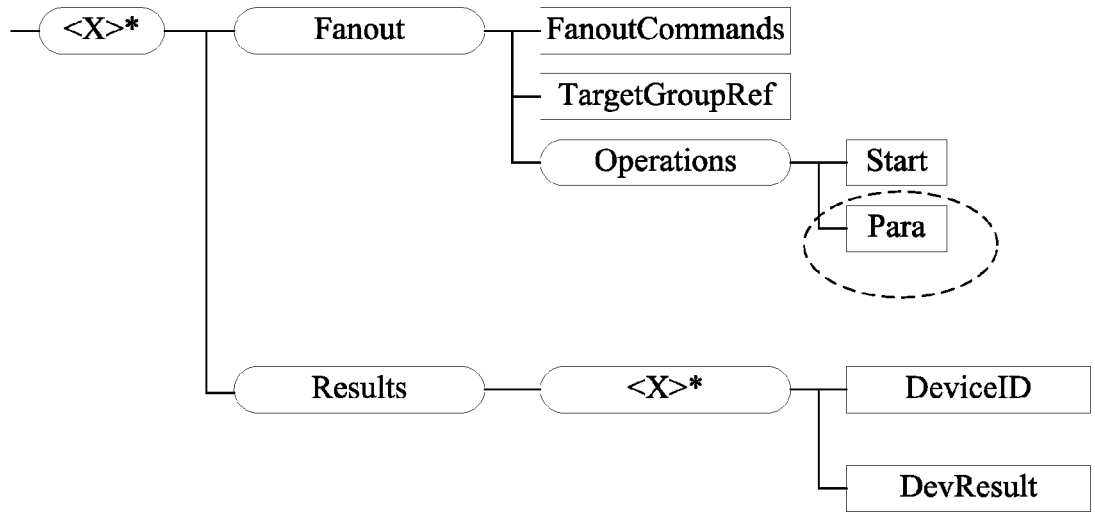
FIG. 3 is a schematic structural diagram of an operation command management tree according to an embodiment of the present invention.

It should be noted that, when the server is a DM server, a gateway under GwMO architecture works in a proxy mode, that is, one DM session is kept between a DMS and a GW and one DM session is kept between the GW and a Device, and a device management command is sent to one or more terminals simultaneously, a Fanout mechanism needs to be used. A Fanout MO is saved in the Gateway. As shown in FIG. 3, functions of nodes under a Fanout subtree are as follows: FanoutCommands are filled by the DMS and are management commands for a terminal; TargetGroupRef corresponds to an id of a group defined under a DevGroup substree in a Config MO, and the gateway finds a target terminal according to the id. Start is an executable node, and is triggered by the DMS to be executed, to fan out commands of the FanoutCommands to the target terminal. In the embodiment of the present invention, if the operation information carries the return format of the execution result of the operation command for performing the management operation on the target terminal, then, as shown in FIG. 3, the gateway extends the Fanout subtree and establishes a Para node, where a return format of a corresponding operation command execution result is recorded in the Para node.

202: The gateway sends a corresponding operation command to the target terminal according to the operation information, and receives an operation command execution result, sent by the target terminal, of the operation command.

Sending the corresponding operation command to the target terminal according to the operation information, and receiving the operation command execution result sent by the target terminal may be specifically executed according to the description in the prior art, which will not be described in the embodiment of the present invention again.

It should be noted that, when the Para node is established in step 201, and when the gateway sends the corresponding operation command to the target terminal according to the operation information, that is, runs the Start node, TargetRef carries a value of the Para node, which is used for notifying a return format of the operation command execution result to the gateway.

In addition, during asynchronous communication, the gateway keeps correspondence among an operation command, an operation command execution result and a server in the following manners, which specifically include the following manners. A first manner is setting a command table. The command table is described in Table 1, including a server, a target device identifier and an operation command identifier.

TABLE 1

| From Server | To Device | TokenID |
|---|---|---|
| DM001 | Device1 | 1295790618 |
| DM001 | Device2 | 1295790618 |
| DM001 | Devicei | 1295790618 |
| DM001 | Device200 | 1295790618 |

A second manner is: when executing the operation command, using, by the gateway, a SourceRef label in SynHdr to carry an operation command identifier. For example, when "1295790618" is an operation command identifier, the specific operation is as follows:
<SyncHdr>
<SourceRef> 1295790618</SourceRef>
<SyncBody>
Put the operation command here
</SyncBody>
</SyncHdr>

A third manner is: when executing the operation command, adding, by the gateway, Alert in SyncBody to carry an operation command identifier. For example, when "1295790618" is an operation command identifier, the specific operation is as follows:
<SyncBody>
<Alert>
<CmdID>212</CmdID>
<Data>1299</Data>
<Item><Data>1295790618</Data></Item>
</Alert>
Put the operation command here
</SyncBody>

A fourth manner is: when executing the operation command, adding, by the gateway, correlator in the SyncBody to carry an operation command identifier. For example, when "1295790618" is an operation command identifier, the specific operation is as follows:

<SyncBody>
<Correlator>1295790618</Correlator>
Put the operation command here
</SyncBody>

203: If there is an indication of a return format for the operation command execution result, the gateway processes the operation command execution result according to the indicated return format of the operation command execution result, to obtain an operation command execution result conforming to the return format.

For the corresponding description of the return format, reference may be made to the corresponding description in step 101 in FIG. 1, which will not be described in the embodiment of the present invention again.

204: The gateway sends the operation command execution result conforming to the return format to the server.

Further, in order to satisfy requirements of different users, after the gateway receives the operation command execution result sent by the target terminal, the method further includes determining whether a return format for specifying the operation command execution result is stored in the gateway; if the return format for specifying the operation command execution result is stored, processing the execution result according to the return format of the operation command execution result to obtain an operation command execution result conforming to the return format; if the return format for specifying the operation command execution result is not stored in the gateway, sending the operation command execution result to the server, where when it is determined whether the return format for specifying the operation command execution result is stored in the gateway, and when the gateway saves the specified return format of the operation command execution result in a form of a node, it is determined whether a node storing the specified return format of the operation command execution result exists in the gateway, which is definitely not limited by the embodiment of the present invention, and other methods for saving the specified return format of the operation command execution result also belong to the protection scope of the embodiment of the present invention.

Figure 4:
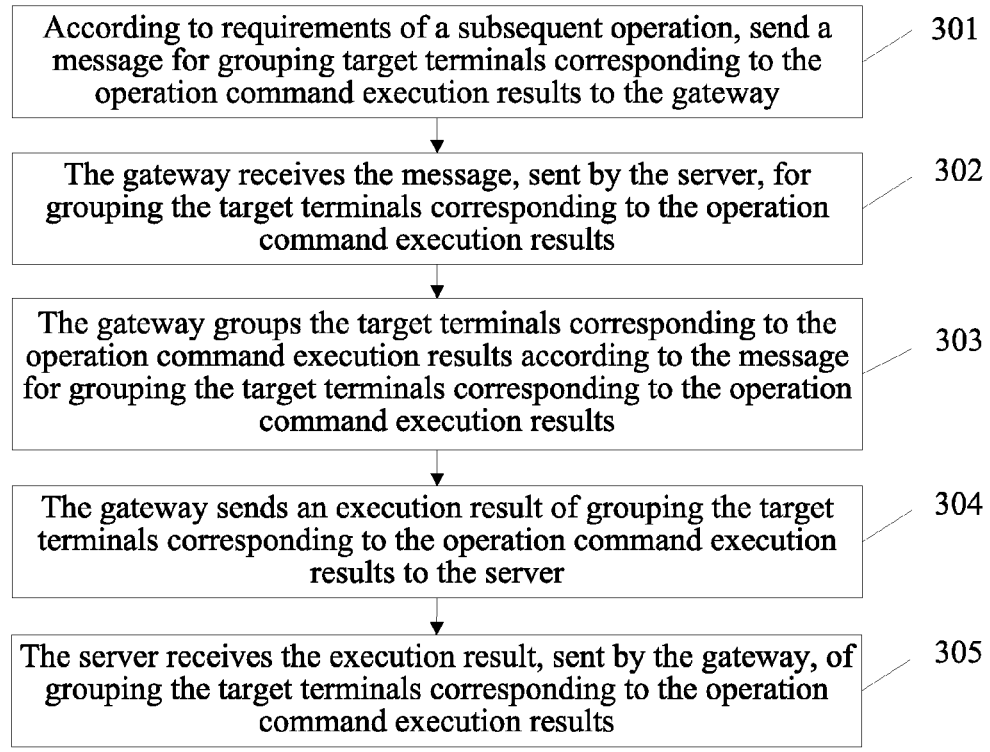
FIG. 4 is a flow chart of another terminal management method according to an embodiment of the present invention.

Optionally, after the server receives the operation command execution result conforming to the return format and returned by the gateway, and for the convenience of performing, by the server, a subsequent management operation on the execution result, as shown in FIG. 4, the method further includes the following steps.

301: According to requirements of a subsequent operation, send a message for grouping target terminals corresponding to the operation command execution results to the gateway, so that the gateway groups, according to the message for grouping the target terminals corresponding to the operation command execution results, the target terminals corresponding to the operation command execution results.

During synchronous transmission, the message may carry a grouping condition for grouping the target terminals corresponding to the operation command execution results, or may not carry a grouping condition for grouping the target terminals corresponding to the operation command execution results, which are not limited by the embodiment of the present invention.

For example, the gateway groups the target devices including 100 terminals which are marked as group 1. After the server performs a first round of operation commands on group 1 through the gateway, only 90 target terminals in group 1 returns results of successful operations. The gateway performs classification according to the operation command execution results, returns, to the server, a classification result that 90 target terminals succeed and 10 target terminals fail. At this time, the server only needs to perform subsequent operations on the 90 successful devices, and group 1 is not applicable any more. The server indicates the gateway to group the target terminals to group the 90 devices as group 2, so as to perform subsequent operations.

302: The gateway receives the message, sent by the server, for grouping the target terminals corresponding to the operation command execution results.

303: The gateway groups the target terminals corresponding to the operation command execution results according to the message for grouping the target terminals corresponding to the operation command execution results.

Specifically, grouping, by the gateway, the target terminals corresponding to the operation command execution results according to the message for grouping the target terminals corresponding to the operation command execution results includes:

If the message for grouping the target terminals corresponding to the operation command execution result carries a grouping condition for grouping the target terminals corresponding to the operation command execution results, grouping the target terminals corresponding to the operation command execution results according to the message for grouping the target terminals corresponding to the operation command execution results is grouping the target terminals corresponding to the operation command execution results according to the grouping condition.

If the message for grouping the target terminals corresponding to the operation command execution result does not carry a grouping condition for grouping the target terminals corresponding to the operation command execution results, grouping the target terminals corresponding to the operation command execution results according to the message for grouping the target terminals corresponding to the operation command execution results is performing grouping according to the operation command execution results, where each group includes target terminals corresponding to the same operation command execution result.

304: The gateway sends an execution result of grouping the target terminals corresponding to the operation command execution results to the server, where the execution result includes that the grouping succeeds or fails.

Figure 5:
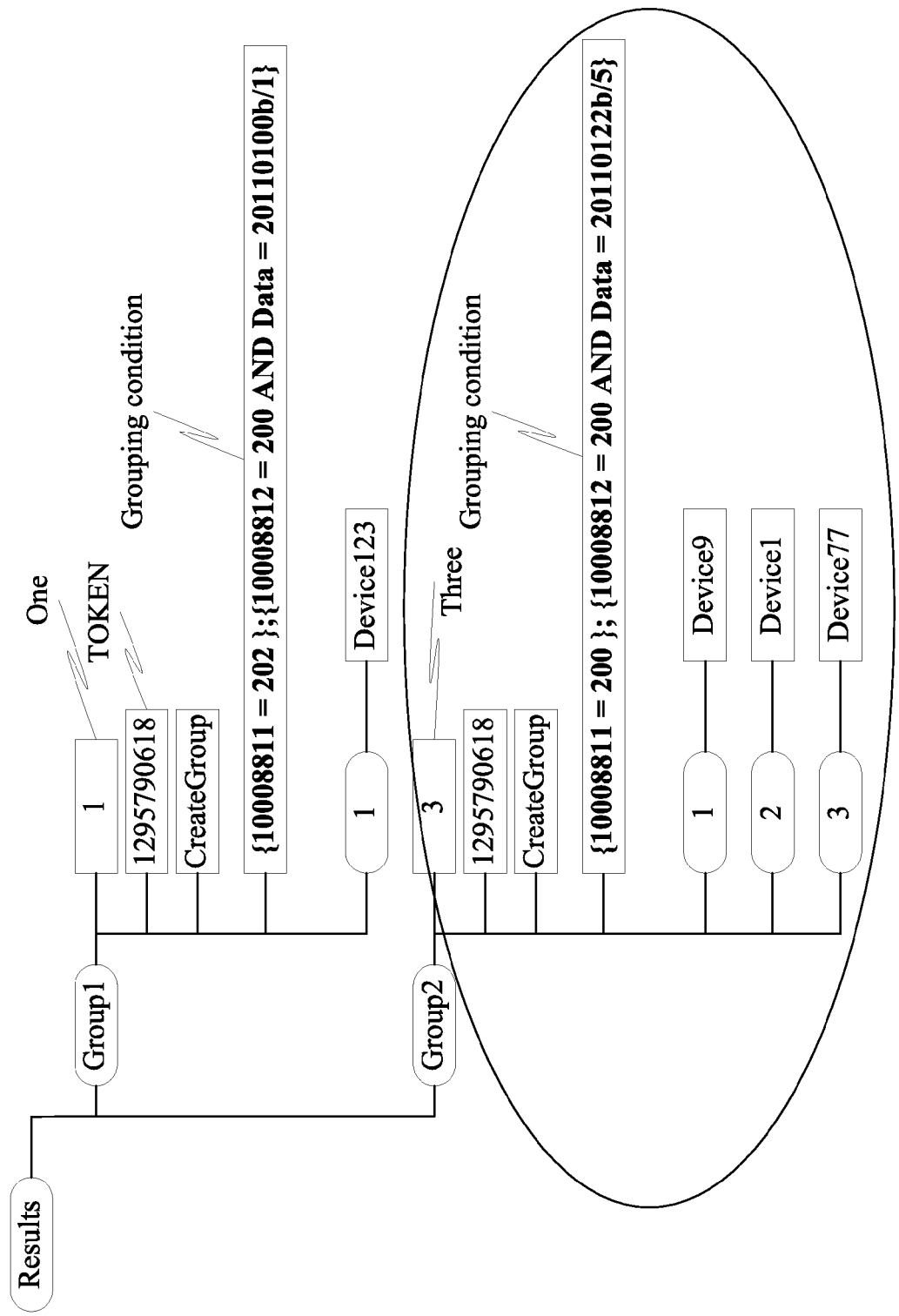
FIG. 5 is a schematic structural diagram of another operation command management tree according to an embodiment of the present invention.

305: The server receives the execution result, sent by the gateway, of grouping the target terminals corresponding to the operation command execution results, so as to perform subsequent operations for the target terminals corresponding to the operation command execution results. For example, as shown in FIG. 5, subsequent operations are performed on target terminals corresponding to operation command execution results in Group2. Then, CreateGroup may be executed, and new non-grouping information is regenerated in a ConfigMO object in a gateway management tree.

In addition, it should be noted that, during asynchronous transmission, after the server receives the operation command execution result conforming to the return format and returned by the gateway, and for the convenience of performing, by the server, a subsequent management operation on the execution result, the embodiment of the present invention further includes, according to requirements of a subsequent operation, sending, by the server, a grouping condition message for grouping target terminals corresponding to operation command execution results to the gateway, where the grouping condition message carries a grouping condition for grouping the target terminals corresponding to the operation command execution results, so that the gateway groups the target terminals corresponding to the operation command execution results according to the grouping condition, and receiving, by the gateway, the grouping condition message sent by the server, and grouping the target terminals corresponding to the operation command execution results according to the grouping condition.

In addition, it should be noted that, in the process of asynchronous transmission, if the gateway only receives the message for grouping the target terminals corresponding to the operation command execution results, but does not receive the grouping condition message, then, grouping is performed according to the operation command execution results by default, where each group includes target terminals corresponding to the same operation command execution result.

Further, optionally, in order to implement asynchronous management, the server creates and maintains a management operation table. The management operation table at least includes the following information: an operation command number, an operation command name, a path of a target terminal, and an operation command execution result identifier, as described in Table 2.

cation information, which is for executing the operation command, from the server when the operation command expires, the gateway automatically sends the expiry operation command to a corresponding target terminal without waiting for the indication information for executing the operation command; and the not allowing automatic execution of the gateway when the operation command expires represents that, when the gateway executes the operation command, if the gateway does not receive indication information, which is for executing the operation command, from the server when the operation command expires, the gateway needs to wait for the indication information for executing the operation command and cannot send the expiry operation command to a corresponding target terminal. Because functions of gateways are different, each gateway has its own MaxFanoutTime, used for representing the existing time of one Fanout object of the gateway. When configuring the Fanout object, the server also shows a value marked as TimeOut and used for representing the existing time of one Fanout operation command. Therefore, the validity period of the operation command may be a smaller value between MaxFanoutTime and TimeOut, but the embodiment of the present invention is not limited thereto, and the validity period can be set in other manners.

TABLE 2

| Operation # | Command | mode | To | Via | SetTime |
|---|---|---|---|---|---|
| 0012002 | xxxxx | 2 | Group1 | //Gateway003./A/B/Fanoutobject1 | 1295790618 Note: It represents 2011-01-23 13:50:18Z. |
| 0012003 | | 1 | Device 1 | NULL | 1295791211 |

Operation# is an operation command number; Command is an operation command name; Via is a path of a target terminal; SetTime is an operation command execution result identifier; mode is a mode for the gateway to execute an operation command; and To is a group where the target terminal is located. It should be noted that, SetTime is the operation command execution result identifier, representing a unique executed operation command, and the representation form is not limited to the foregoing figures.

After the gateway finishes executing the corresponding operation command, the server updates a pre-defined management operation table according to the operation command execution result.

Further, optionally, in order to delete, from the gateway in time, an operation command that the server cannot continue to trigger, so as to save the storage space of the gateway, the embodiment of the present invention further includes the following.

Figure 6:
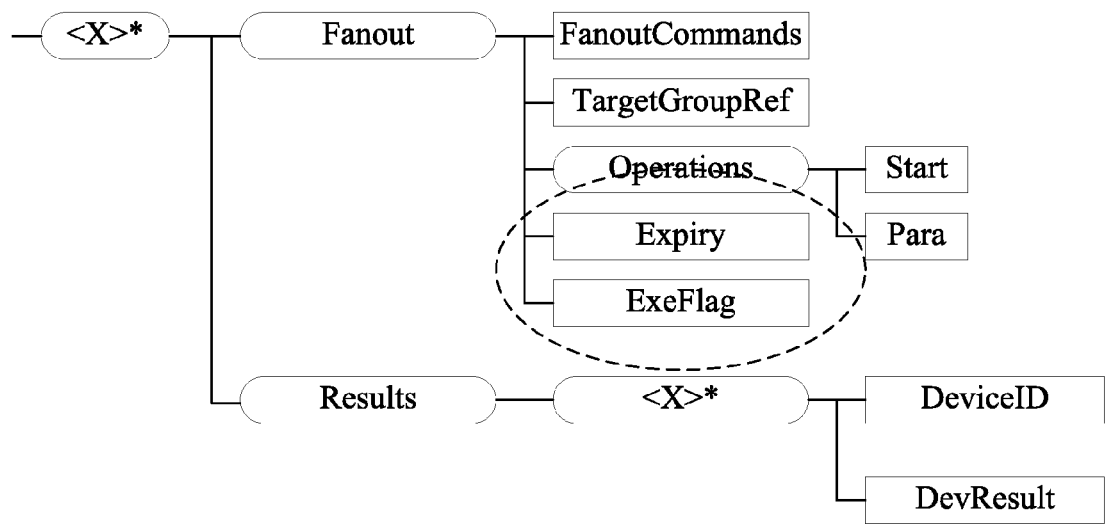
FIG. 6 is a schematic structural diagram of another operation command management tree according to an embodiment of the present invention.

When the server sends the operation information for performing the management operation on the target terminal to the gateway, the operation information carries a validity period of the operation command, or carries a validity period of the operation command and a mode for the gateway to execute the operation command, so that the gateway deletes an expiry operation command. The mode for the gateway to execute the operation command includes allowing automatic execution of the gateway when the operation command expires and not allowing automatic execution of the gateway when the operation command expires. The allowing automatic execution of the gateway when the operation command expires represents that, when the gateway executes the operation command, if the gateway does not receive indi- When a gateway under GwMO architecture works in a proxy mode, and when the server sends the operation information for performing the management operation on the target terminal to the gateway, carrying, by the operation information, the validity period of the operation command or the validity period of the operation command and the mode for the gateway to execute the operation command so that the gateway deletes the expiry operation command may be specifically: extending, by the server, the Fanout object in the gateway, and specifying, by the server, the validity period of the operation command or the validity period of the operation command and the mode for the gateway to execute the operation command. For example, as shown in FIG. 6, a corresponding Expiry node and an ExeFlag node are created in the Fanout object. The Expiry node is used for bearing the validity period of the operation command, and can be a count-down counter with a 32-bit int data type and with a minimum unit of second, which is not limited by the embodiment of the present invention. Another data type may also be possible. The ExeFlag node is used for bearing the mode for the gateway to execute the operation command, and can be an int type. For example, 1 represents allowing automatic execution of the gateway when the operation command expires, 0 represents not allowing automatic execution of the gateway when the operation command expires, and 2 represents that the command is already executed, which are not limited by the embodiment of the present invention. Another data type may also be possible.

Deleting, by the gateway, the expiry operation command according to the validity period of the operation command or the validity period of the operation command and the mode for the gateway to execute the operation command specifically includes the following.

Figure 7:
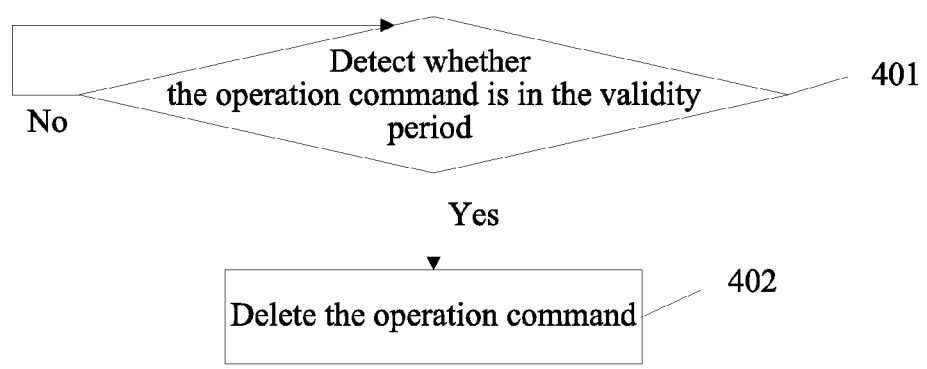
FIG. 7 is a flow chart of another terminal management method according to an embodiment of the present invention.

When the operation information carries the validity period of the operation command, as shown in FIG. 7, the method of deleting, by the gateway, the expiry operation command according to the validity period of the operation command includes the following steps.

401: Detect whether the operation command is in the validity period; if the operation command is not in the validity period, execute step 402; and if the operation command is in the validity period, execute step 401.

When detecting whether the operation command is in the validity period, the detection can be performed according to a preset period of time or can be performed in real time, which is not limited by the embodiment of the present invention. When the detection is performed according to the preset period of time, the preset of time may be set according to requirements of a user and may be modified according requirements of the user, which are also not limited by the embodiment of the present invention.

402: Delete the operation command.

It should be noted that, when the operation information only carries the validity period of the operation command, and does not carry the mode for the gateway to execute the operation command, the operation command is to be deleted as long as the operation command is not in the validity period and no matter whether the operation command is executed.

Figure 8:
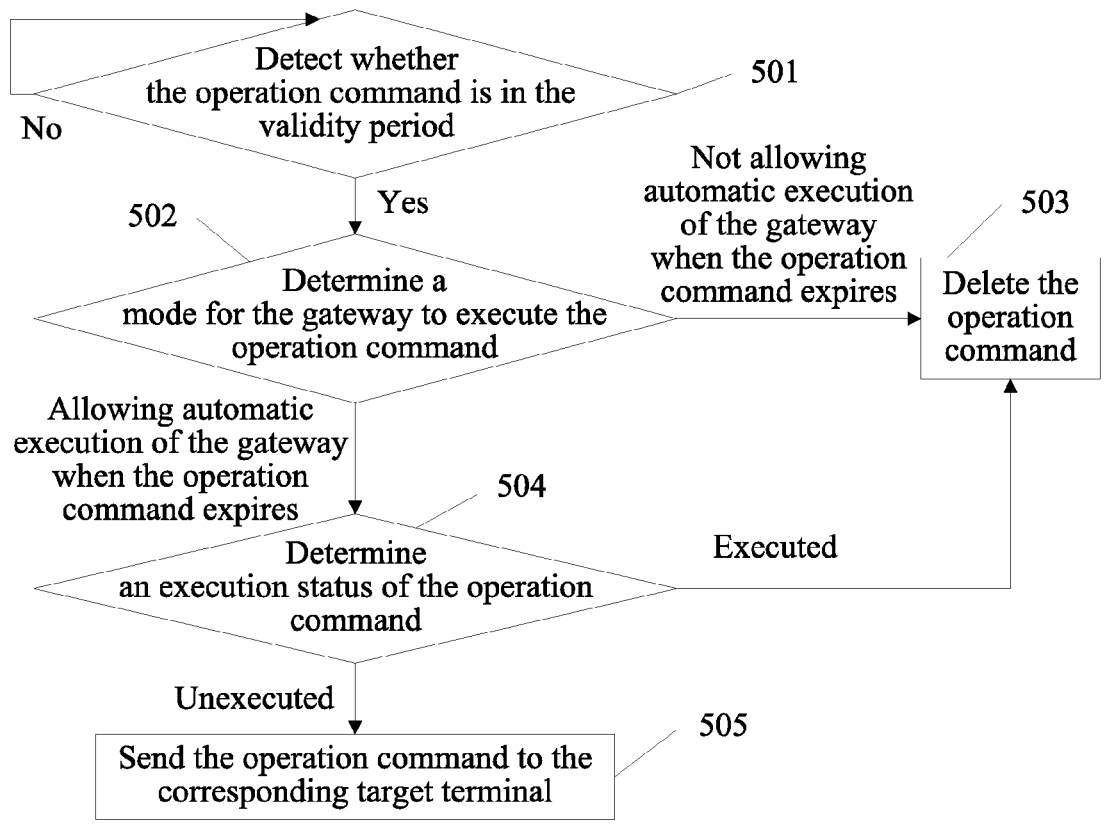
FIG. 8 is a flow chart of another terminal management method according to an embodiment of the present invention.

When the operation information carries the validity period of the operation command and the mode for the gateway to execute the operation command, as shown in FIG. 8, the method of deleting, by the gateway, the expiry operation command according to the validity period of the operation command and the mode for the gateway to execute the operation command includes the following steps.

501: Detect whether the operation command is in the validity period; if the operation command is not in the validity period, execute step 502; if the operation command is in the validity period, execute step 501.

502: Determine a mode for the gateway to execute the operation command; if the mode for the gateway to execute the operation command is not allowing automatic execution of the gateway when the operation command expires, execute step 503; if the mode for the gateway to execute the operation command is allowing automatic execution of the gateway when the operation command expires, execute step 504.

503: Delete the operation command.

504: Determine an execution status of the operation command, where the execution status of the operation command is an unexecuted state and an executed state; if the execution status of the operation command is the executed state, execute step 503; if the execution status of the operation command is the unexecuted state, execute step 505.

505: Send the operation command to a corresponding target terminal.

Further, optionally, for the convenience of managing, by the server, the terminal device, the method further includes: after deleting the operation command, sending, by the gateway, a notification message that the expiry operation command is already deleted to the server; receiving, by the server, the notification message, sent by the gateway, that the expiry operation command is already deleted, and updating a predefined operation command execution status table according to the notification message, where the predefined operation command execution status table at least includes an operation command number, an operation command name and an operation command execution status of the operation command.

In the embodiment of the present invention, when the operation information for performing the management operation on the target terminal is sent to the gateway, the operation information carries the return format of the execution result of the operation command for performing the management operation on the target terminal; after the gateway receives the operation command execution result sent by the target terminal, and when the operation command execution result has the indication of the return format, the gateway processes the operation command execution result according to the return format to obtain the operation command execution result conforming to the return format, and sends the operation command execution result conforming to the return format to the server, so that when processing the operation command execution result, the server can process the same kind of execution results in bulk according to the return format of the execution result. Compared with the prior art that the server processes the execution results one by one, the present invention improves the efficiency for the server to process the operation command execution result of the terminal.

In the embodiment of the present invention, for the convenience of a subsequent operation, the server may instruct the gateway to regroup target terminals according to the execution results of performing operation commands on the target terminals according to management requirements. Further, in the embodiment of the present invention, the server maintains a management operation table, so that an executed command is recorded for the convenience of a further operation.

Further, in the embodiment of the present invention, when the server sends the operation information for performing the management operation on the target terminal to the gateway, the operation information carries the validity period of the operation command or the validity period of the operation command and the mode for the gateway to execute the operation command, so that the gateway deletes the expiry operation command according the operation information, thereby saving a large amount of storage space of the gateway.

Figure 9:
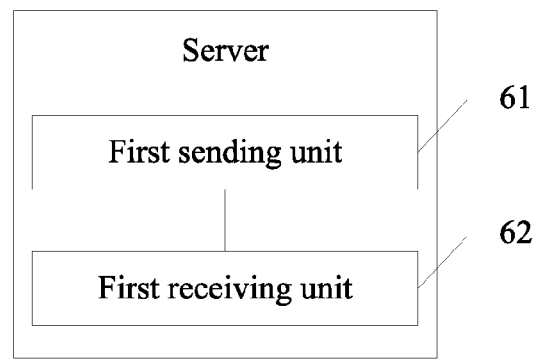
FIG. 9 is a composition block diagram of a server according to an embodiment of the present invention.

An embodiment of the present invention provides a server. As shown in FIG. 9, the server includes a first sending unit 61 and a first receiving unit 62.

The first sending unit 61 is configured to send operation information for performing a management operation on a target terminal to a gateway, where the operation information carries a return format of an execution result of an operation command for performing the management operation on the target terminal, so that the gateway returns the operation command execution result, returned by the target terminal, in the return format to the server, and the return format is indication information indicating how the gateway groups operation command execution results of target terminals. For the corresponding description of the return format, reference may be made to the corresponding description in step 101 in FIG. 1, and details are not described in the embodiment of the present invention again.

The first receiving unit 62 is configured to receive an operation command execution result which is sent by the gateway and conforms to the return format.

Figure 10:
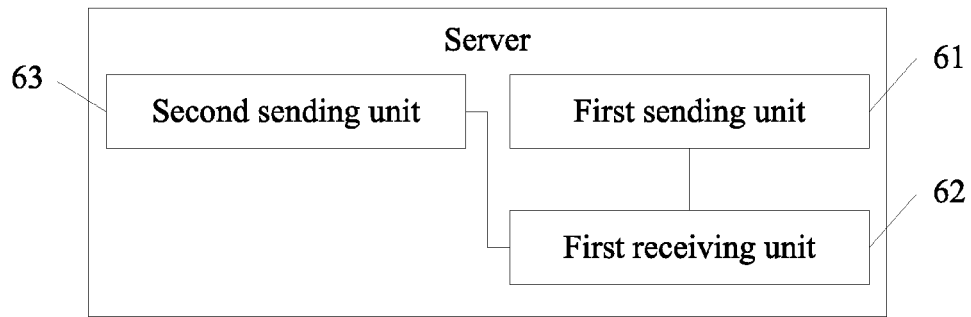
FIG. 10 is a composition block diagram of another server according to an embodiment of the present invention.

Further, optionally, for the convenience of performing, by the server, a subsequent management operation on the execution result, as shown in FIG. 10, the server further includes: a second sending unit 63.

The second sending unit 63 is configured to, after the first receiving unit 62 receives the operation command execution result sent by the gateway and conforming to the return format, send a message for grouping target terminals corresponding to operation command execution results to the gateway according to requirements of the subsequent operation, so that the gateway groups, according to the message for grouping the target terminals corresponding to the operation command execution results, the target terminals corresponding to the operation command execution results. When the second sending unit 63 sends the message for grouping the target terminals corresponding to the operation command execution results to the gateway, the message for grouping the target terminals corresponding to the operation command execution results may carry a grouping condition for grouping the target terminals corresponding to the operation command execution results, so that the gateway groups the target terminals corresponding to the operation command execution results according to the grouping condition; the message for grouping the target terminals corresponding to the operation command execution results may also not carry a grouping condition for grouping the target terminals corresponding to the operation command execution results, then the gateway groups the target terminals corresponding to the operation command execution results according to the operation command execution results, which are not limited by the embodiment of the present invention.

Figure 11:
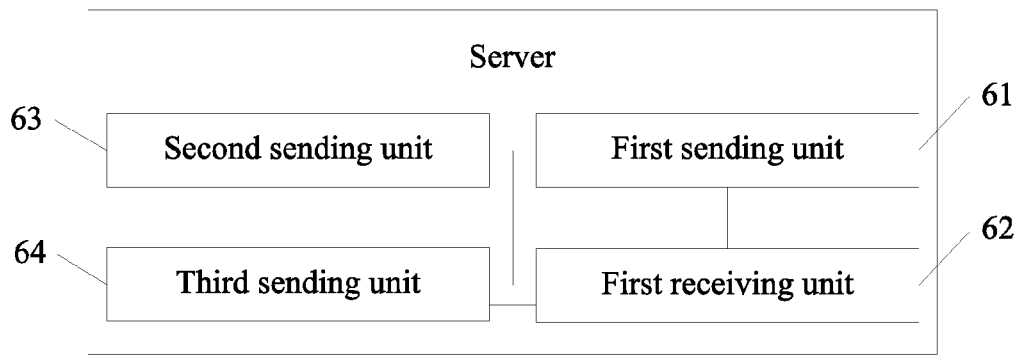
FIG. 11 is a composition block diagram of another server according to an embodiment of the present invention.

Further, optionally, as shown in FIG. 11, the server further includes a third sending unit 64.

The third sending unit 64 is configured to, after the first receiving unit 62 receives the operation command execution result sent by the gateway and conforming to the return format, send a grouping condition message for grouping target terminals corresponding to the operation command execution results to the gateway, where the grouping condition message carries a grouping condition for grouping the target terminals corresponding to the operation command execution results, so that the gateway groups the target terminals corresponding to the operation command execution results according to the grouping condition.

Figure 12:
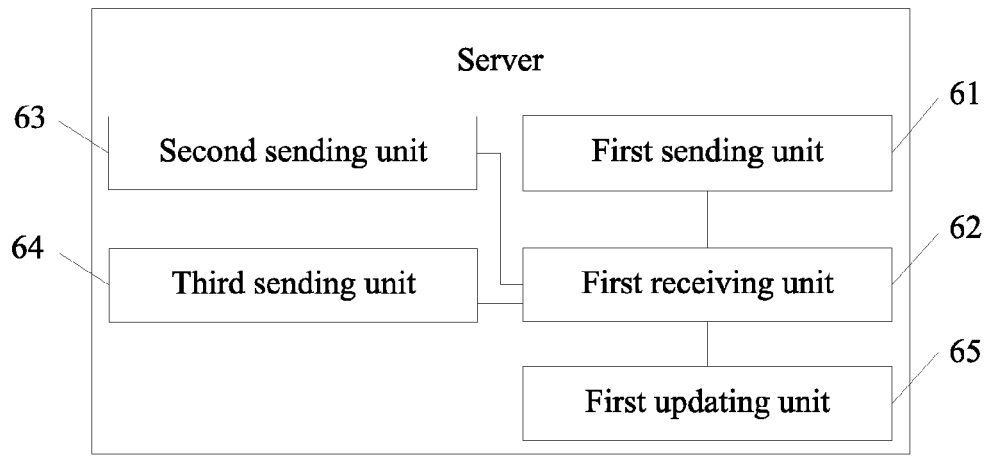
FIG. 12 is a composition block diagram of another server according to an embodiment of the present invention.

Further, optionally, in order to implement asynchronous management, as shown in FIG. 12, the server further includes a first updating unit 65.

The first updating unit 65 is configured to, after the first receiving unit 62 receives the operation command execution result which is sent by the gateway and conforms to the return format, update a predefined management operation table according to the operation command execution result, where the management operation table includes an operation command number, an operation command name, a path of a target terminal, and an operation command execution result identifier.

Further, in order to delete, from the gateway in time, some operation commands that the server cannot continue to trigger, so that the gateway saves the storage space of the gateway, when the first sending unit 61 sends the operation information for performing the management operation on the target terminal to the gateway, the operation information carries a validity period of the operation command or carries a validity period of the operation command and a mode for the gateway to execute the operation command, so that the gateway deletes an expiry operation command. The mode for the gateway to execute the operation command includes allowing automatic execution of the gateway when the operation command expires and not allowing automatic execution of the gateway when the operation command expires. For the detailed description about allowing automatic execution of the gateway when the operation command expires and not allowing automatic execution of the gateway when the operation command expires, reference may be made to corresponding description in step 305 in FIG. 4, and details are not described in the embodiment of the present invention again.

Figure 13:
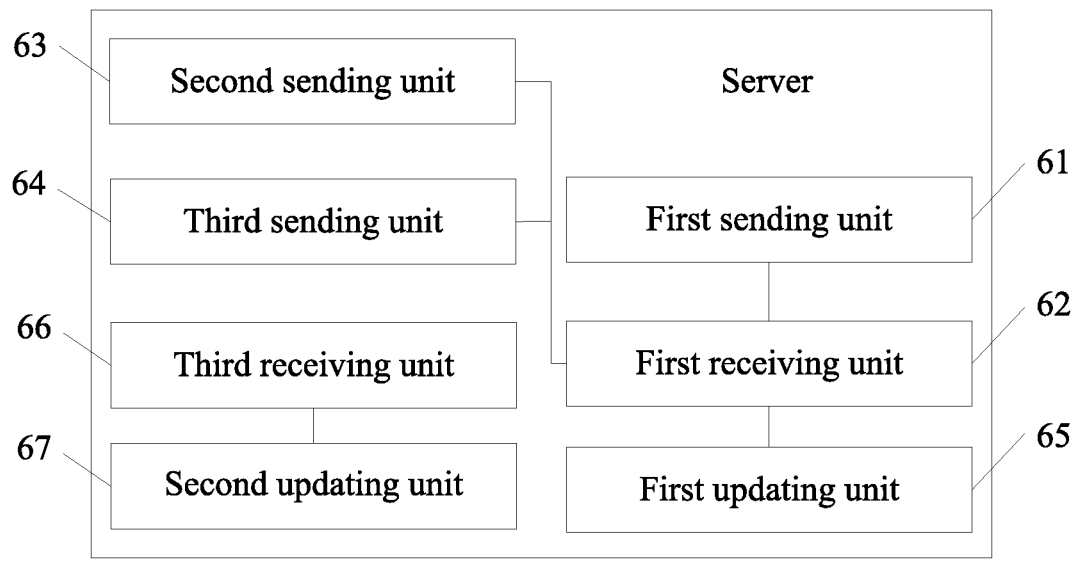
FIG. 13 is a composition block diagram of another server according to an embodiment of the present invention.

Further, optionally, as shown in FIG. 13, the server further includes a third receiving unit 66 and a second updating unit 67.

The third receiving unit 66 is configured to receive a notification message, sent by the gateway, that the expiry operation command is already deleted.

The second updating unit 67 is configured to update a predefined operation command execution status table according to the notification message received by the second receiving unit 66.

It should be noted that, other description of each function module included in the server provided by the embodiment of the present invention, reference may be made to the related description in FIG. 1 to FIG. 8, and details are not described in the embodiment of the present invention again.

Figure 14:
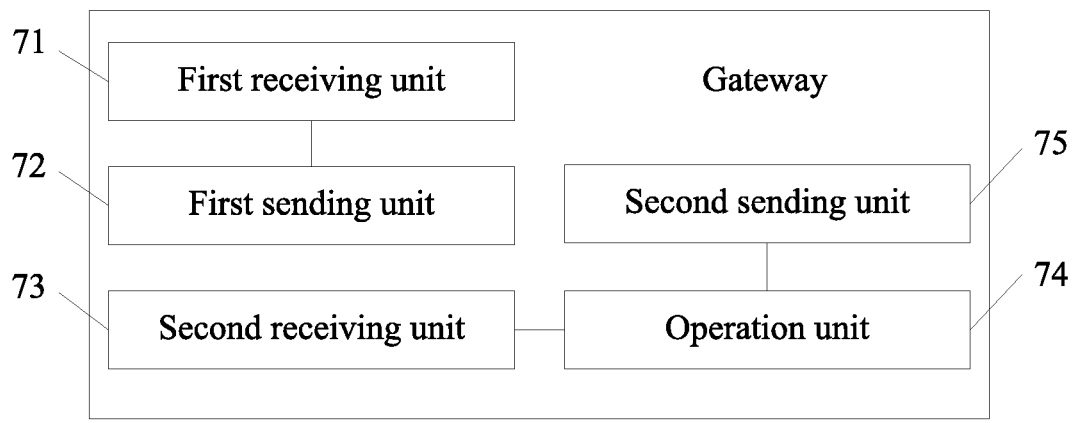
FIG. 14 is a composition block diagram of a gateway according to an embodiment of the present invention.

An embodiment of the present invention further provides a gateway. As shown in FIG. 14, the gateway includes a first receiving unit 71, a first sending unit 72, a second receiving unit 73, an operation unit 74, and a second sending unit 75.

The first receiving unit 71 is configured to receive operation information, sent by the server, for performing a management operation on the target terminal.

The first sending unit 72 is configured to send a corresponding operation command to the target terminal according to the operation information received by the first receiving unit 71.

The second receiving unit 73 is configured to receive an operation command execution result, sent by the target terminal, of the operation command;

The operation unit 74 is configured to, if there is an indication of a return format for the operation command execution result, process, according to the indicated return format of the operation command execution result, the operation command execution result received by the second receiving unit 73, to obtain an operation command execution result conforming to the return format.

The second sending unit 75 is configured to send, to the server, the operation command execution result obtained by the operation unit 74 and conforming to the return format.

Figure 15:
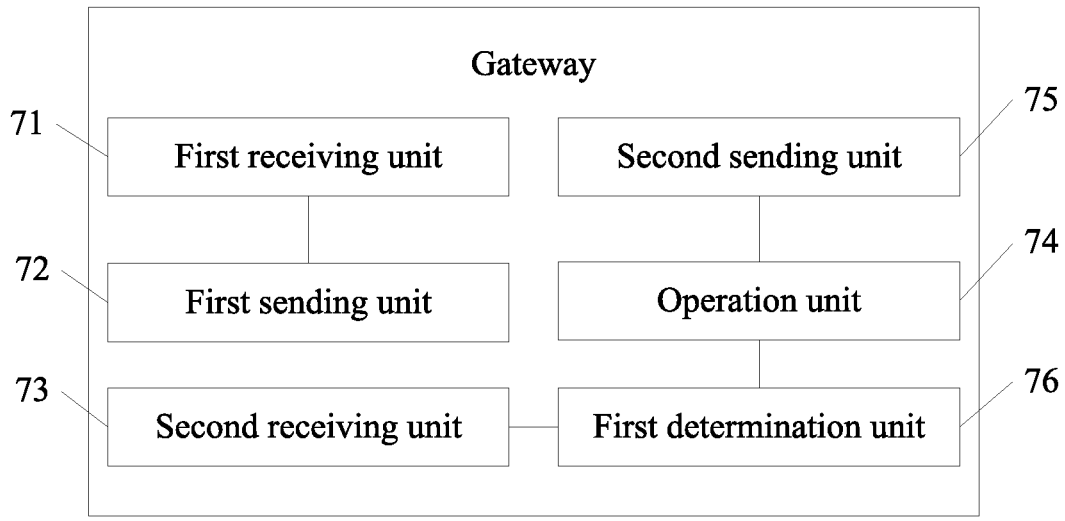
FIG. 15 is a composition block diagram of another gateway according to an embodiment of the present invention.

Further, optionally, as shown in FIG. 15, the gateway further includes a first determination unit 76.

The first determination unit 76 is configured to, after the second receiving unit 73 receives the operation command execution result, sent by the target terminal, of the operation command, determine whether a return format of the operation command execution result is stored in the gateway.

The operation unit 74 is further configured to, when the first determination unit 76 determines that the return format of the operation command execution result is stored in the gateway, process the operation command execution result according to the stored return format to obtain the operation command execution result conforming to the return format.

The second sending unit 75 is further configured to, when the first determination unit 76 determines that the return format of the operation command execution result is not stored in the gateway, send the operation command execution result to the server.

Figure 16:
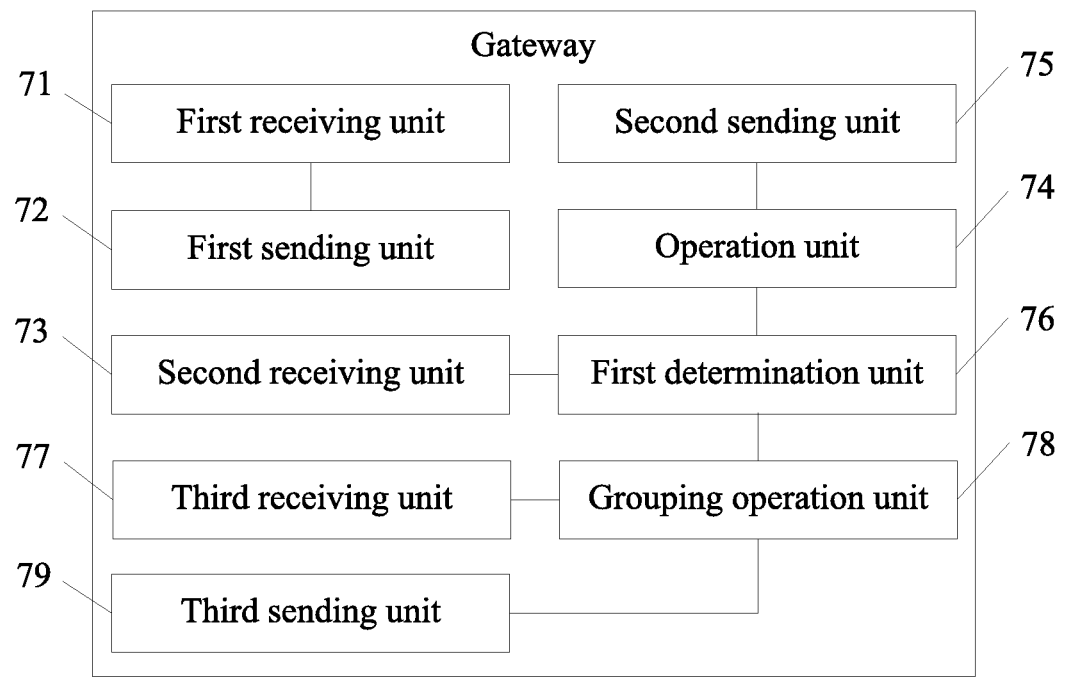
FIG. 16 is a composition block diagram of another gateway according to an embodiment of the present invention.

Further, optionally, as shown in FIG. 16, the gateway further includes a third receiving unit 77, a grouping operation unit 78, and a third sending unit 79.

The third receiving unit 77 is configured to, after the second sending unit 75 sends the operation command execution result conforming to the return format to the server, receive a message, sent by the server, for grouping target terminals corresponding to operation command execution results, where the message may carry a grouping condition for grouping the target terminals corresponding to the operation command execution results or may not carry a grouping condition for grouping the target terminals corresponding to the operation command execution results.

The grouping operation unit 78 is configured to group the target terminals corresponding to the operation command execution results according to the message, received by the third receiving unit 77, for grouping the target terminals corresponding to the operation command execution results.

Grouping, by the grouping operation unit 78, the target terminals corresponding to the operation command execution results according to the message, received by the third receiving unit 77, for grouping the target terminals corresponding to the operation command execution results specifically includes: when the message, received by the third receiving unit 77, for grouping the target terminals corresponding to the operation command execution results carries a grouping condition for grouping the target terminals corresponding to the operation command execution results, grouping, by the grouping operation unit 78, the target terminals corresponding to the operation command execution results according to the grouping condition; when the message, received by the third receiving unit 77, for grouping the target terminals corresponding to the operation command execution results does not carry the grouping condition for grouping the target terminals corresponding to the operation command execution results, grouping, by the grouping operation unit 78, the target terminals corresponding to the operation command execution results according to the operation command execution results, where each group includes a target terminal corresponding to the same operation command execution result.

The third sending unit 79 is configured to send an execution result of grouping the target terminals corresponding to the operation command execution results to the server.

Figure 17:
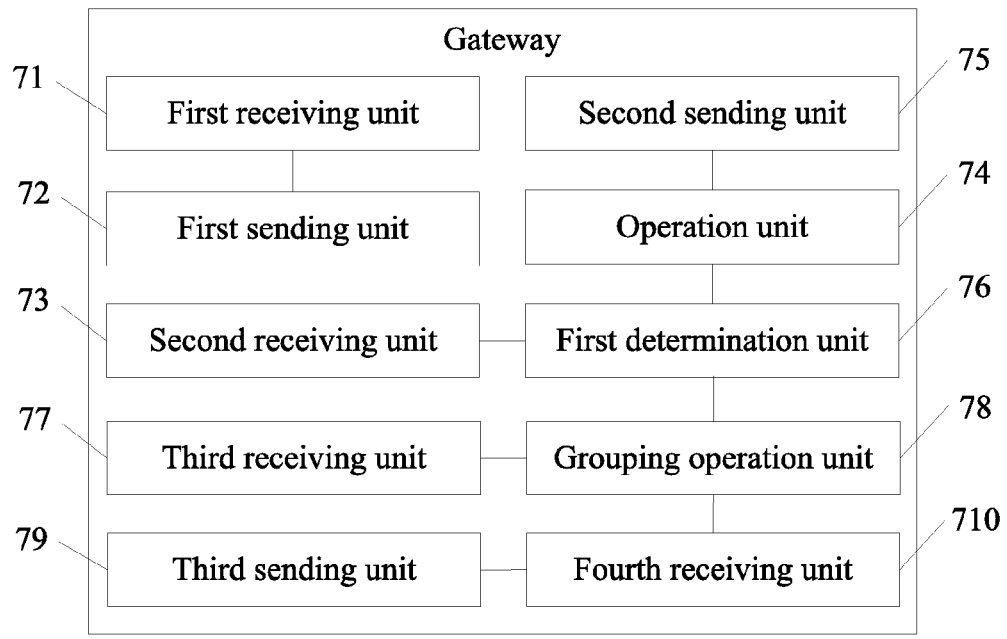
FIG. 17 is a composition block diagram of another gateway according to an embodiment of the present invention.

Further, optionally, as shown in FIG. 17, the gateway further includes a fourth receiving unit 710.

The fourth receiving unit 710 is configured to, after the second sending unit 75 sends the operation command execution result conforming to the return format to the server, receive a grouping condition message, sent by the server, for grouping target terminals corresponding to the operation command execution results, where the grouping condition message carries a grouping condition for grouping the target terminals corresponding to the operation command execution results.

The grouping operation unit 78 is configured to group the target terminals corresponding to the operation command execution results according to the grouping condition.

In addition, it should be noted that, in the process of asynchronous transmission, if the gateway only receives the message for grouping the target terminals corresponding to the operation command execution results, but does not receive the grouping condition message, grouping is performed according to the operation command execution results by default, where each group includes a target terminal corresponding to the same operation command execution result.

Figure 18:
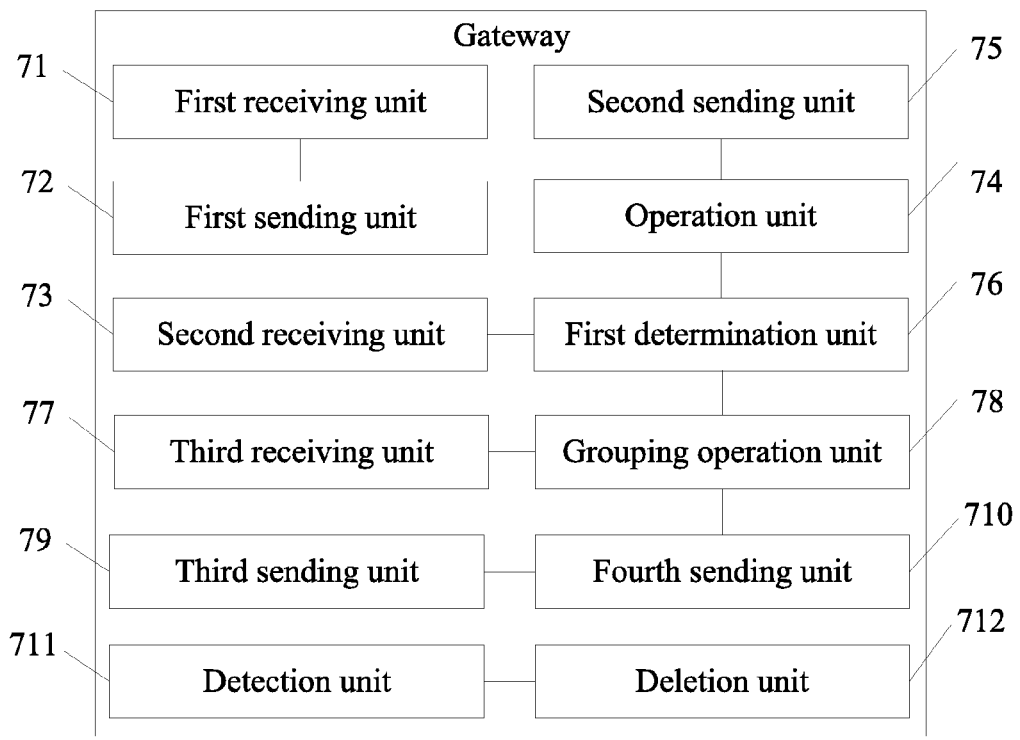
FIG. 18 is a composition block diagram of another gateway according to an embodiment of the present invention.

Further, optionally, as shown in FIG. 18, the gateway further includes a detection unit 711 and a deletion unit 712.

The detection unit 711 is configured to, when the operation information received by the first receiving unit 71 carries a validity period of the operation command, detect whether the operation command is in the validity period.

The deletion unit 712 is configured to, when the detection unit 711 detects that the operation command is not in the validity period, delete the operation command.

Figure 19:
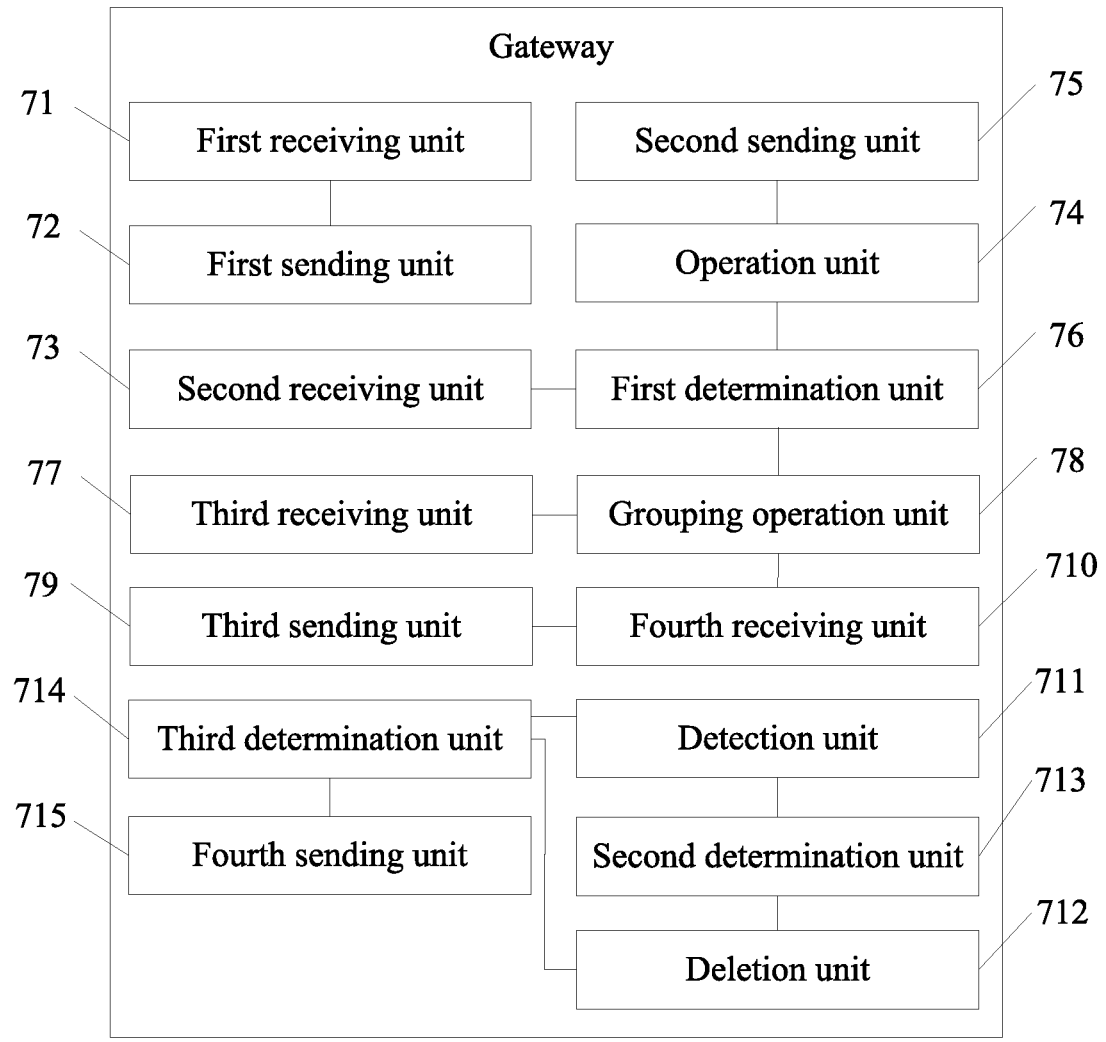
FIG. 19 is a composition block diagram of another gateway according to an embodiment of the present invention.

Further, optionally, as shown in FIG. 19, the gateway further includes a second determination unit 713, a third determination unit 714, and a fourth sending unit 715.

The detection unit 711 is further configured to, when the operation information received by the first receiving unit 71 carries a validity period of the operation command and a mode for the gateway to execute the operation command, detect whether the operation command is in the validity period, where the mode for the gateway to execute the operation command includes allowing automatic execution of the gateway when the operation command expires and not allowing automatic execution of the gateway when the operation command expires.

The second determination unit 713 is configured to, when the detection unit 711 detects that the operation command is not in the validity period, determine a mode for the gateway to execute the operation command.

The deletion unit 712 is further configured to, when the second determination unit 713 determines that the mode for the gateway to execute the operation command is not allowing automatic execution of the gateway when the operation command expires, delete the operation command.

The third determination unit 714 is configured to, when the second determination unit 713 determines that the mode for the gateway to execute the operation command is allowing automatic execution of the gateway when the operation command expires, determine an execution status of the operation command, where the execution status of the operation command is an unexecuted state and an executed state.

The deletion unit 712 is further configured to, when the third determination unit 714 determines that the execution status of the operation command is the executed state, delete the operation command.

The fourth sending unit 715 is configured to, when the third determination unit 714 determines that the execution status of the operation command is the unexecuted state, send the operation command to the corresponding target terminal.

Figure 20:
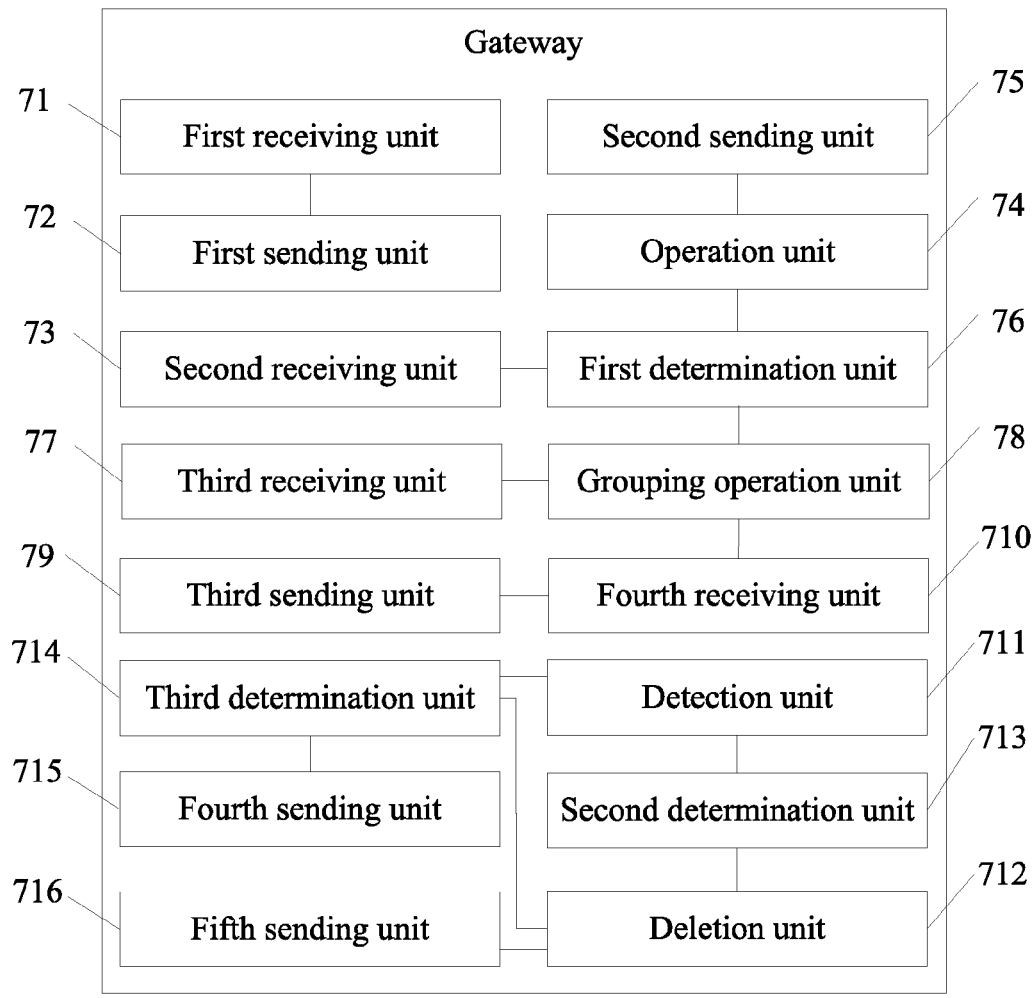
FIG. 20 is a composition block diagram of another gateway according to an embodiment of the present invention.

Further, optionally, as shown in FIG. 20, the gateway further includes a fifth sending unit 716.

The fifth sending unit 716 is configured to, after the deletion unit 712 deletes the operation command, send a notification message that the expiry operation command is already deleted to the server.

It should be noted that, for other description of each function module included in the gateway provided by the embodiment of the present invention, reference may be made to the related description in FIG. 1 to FIG. 8, and details are not described in the embodiment of the present invention again.

Figure 21:
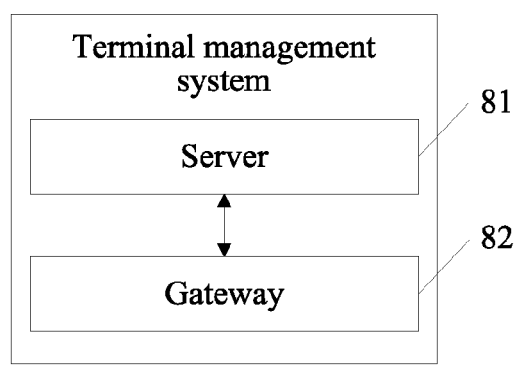
FIG. 21 is a composition block diagram of a system for managing a terminal according to an embodiment of the present invention.

An embodiment of the present invention further provides a system for managing a terminal. As shown in FIG. 21, the system includes a server 81 and a gateway 82.

The server 81 is configured to: send operation information for performing a management operation on a target terminal to the gateway 82, where the operation information carries a return format of an execution result of an operation command for performing the management operation on the target terminal, so that the gateway 82 returns the operation command execution result, returned by the target terminal, in the return format to the server, where the return format is indication information indicating how the gateway groups operation command execution results of target terminals;

and receive an operation command execution result sent by the gateway 82 and confirming to the return format.

The gateway 82 is configured to: receive the operation information sent by the server 81; send a corresponding operation command to the target terminal according to the operation information, and receive an operation command execution result, sent by the target terminal, of the operation command; if there is an indication of a return format for the operation command execution result, process the operation command execution result according to the indicated return format of the operation command execution result, to obtain an operation command execution result conforming to the return format; and send the operation command execution result conforming to the return format to the server 81.

It should be noted that, for other description of each function module included in the gateway provided by the embodiment of the present invention, reference may be made to the related description in FIG. 1 to FIG. 18, and details are not described in the embodiment of the present invention again.

In the embodiment of the present invention, when the operation information for performing the management operation on the target terminal is sent to the gateway, the operation information carries the return format of the execution result of the operation command for performing the management operation on the target terminal; after the gateway receives the operation command execution result sent by the target terminal, and when the operation command execution result has the indication of the return format, the gateway processes the operation command execution result according to the return format to obtain the operation command execution result conforming to the return format, and sends the operation command execution result conforming to the return format to the server, so that when processing the operation command execution result, the server can process the same kind of execution results in bulk according to the return format of the execution result. Compared with the prior art that the server processes the execution results one by one, the present invention improves the efficiency for the server to process the operation command execution result of the terminal.

In the embodiment of the present invention, for the convenience of a subsequent operation, the server may instruct the gateway to regroup target terminals according to the execution results of performing operation commands on target terminals according to management requirements. Further, in the embodiment of the present invention, the server maintains a management operation table, so that an executed command is recorded for the convenience of a further operation.

Further, in the embodiment of the present invention, when the server sends operation information for performing a management operation on a target terminal to the gateway, the operation information carries a validity period of the operation command or a validity period of the operation command and a mode for the gateway to execute the operation command, so that the gateway deletes an expiry operation command according the operation information, thereby saving a large amount of storage space of the gateway.

With the foregoing description of the embodiments, it is understandable to persons skilled in the art that the present invention may be implemented by software plus necessary universal hardware, and definitely may also be implemented by hardware, but in many cases, the software implementation is preferred. Based on such understanding, the technical solutions of the present invention essentially, or the part contributing to the prior art may be implemented in the form of a software product. The computer software product is stored in a readable storage medium, for example, a floppy disk, hard disk, or optical disk of the computer, and includes several instructions for instructing a computer device (which may be a personal computer, a server, a network device) to perform the method described in each embodiment of the present invention.

The foregoing description is merely about specific embodiments of the present invention, but is not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A terminal management method, comprising:
    sending operation information for performing a management operation on a target terminal to a gateway, wherein the operation information carries a return format of an execution result of an operation command for performing the management operation on the target terminal, so that the gateway establishes a node in an Operations subtree of a Fanout subtree of a Fanout Management Object of the gateway, and saves the return format for the operation command execution result in the established node, and the gateway processes an operation command execution result, returned by the target terminal, according to the return format of the operation command execution result, to obtain an operation command execution result conforming to the return format, and returns the operation command execution result, in the return format to a server;
    receiving the operation command execution result which is sent from the gateway and conforms to the return format, the return format including indication information indicating how the gateway groups operation command execution results of target terminals; and
    in response to receiving the operation command execution result from the gateway, and according to requirements of a subsequent operation, sending a message for grouping the target terminals corresponding to the operation command execution results to the gateway, so that the gateway groups, according to the message for grouping the target terminals corresponding to the operation command execution results, the target terminals corresponding to the operation command execution results.

2. The method according to claim 1, wherein the message for grouping the target terminals corresponding to the operation command execution results is a grouping condition message, and wherein the grouping condition message carries a grouping condition for grouping the target terminals corresponding to the operation command execution results, so that the gateway groups the target terminals corresponding to the operation command execution results according to the grouping condition.

3. A terminal management method, comprising:
    receiving operation information, sent by a server, for performing a management operation on a target terminal;
    sending, by a gateway, corresponding operation command to the target terminal according to the operation information, wherein the operation information carries a return format of an execution result of the operation command for performing the management operation on the target terminal, so that the gateway establishes a node in an Operations subtree of a Fanout subtree of a Fanout Management Object of the gateway, and saves the return format for the operation command execution result in the established node;

receiving, by the gateway, an operation command execution result, sent by the target terminal, of the operation command;

if there is an indication of a return format for the operation command execution result, processing, by the gateway, the operation command execution result according to the indicated return format of the operation command execution result, to obtain an operation command execution result conforming to the return format, wherein the return format of the operation command execution result includes a type and a quantity limitation of the return format, and wherein the quantity limitation indicates returning execution results of a specified quantity of operation commands; and sending the operation command execution result conforming to the return format to the server.

4. The method according to claim 3, wherein, after receiving the operation command execution result, the method further comprises:

determining whether the return format of the operation command execution result is stored in the gateway;

if the return format of the operation command execution result is stored in the gateway, processing the operation command execution result according to the stored return format to obtain the operation command execution result conforming to the return format; and if the return format of the operation command execution result is not stored in the gateway, sending the operation command execution result to the server.

5. The method according to claim 3, wherein, after sending the operation command execution result, the method further comprises:

receiving a message, sent by the server, for grouping target terminals corresponding to operation command execution results;

grouping the target terminals corresponding to the operation command execution results according to the message for grouping the target terminals corresponding to the operation command execution results; and sending an execution result of grouping the target terminals corresponding to the operation command execution results to the server.

6. The method according to claim 3, wherein, after sending the operation command execution result, the method further comprises: receiving a grouping condition message, sent by the server, for grouping target terminals corresponding to operation command execution results, wherein the grouping condition message carries a grouping condition for grouping the target terminals corresponding to the operation command execution results; and grouping the target terminals corresponding to the operation command execution results according to the grouping condition.

7. A server, comprising:

a transmitter, configured to send operation information for performing a management operation on a target terminal to a gateway, wherein the operation information carries a return format of an execution result of an operation command for performing the management operation on the target terminal, so that the gateway establishes a node in an Operations subtree of a Fanout subtree of a Fanout Management Object of the gateway, and saves the return format for the operation command execution result in the established node, and the gateway can return the operation command execution result, returned by the target terminal, in the return format to the server, and the return format is indication information indicating how the gateway groups operation command execution results of target terminals, wherein the return format of the operation command execution result includes a type and a quantity limitation of the return format, and wherein the quantity limitation indicates returning execution results of a specified quantity of operation commands; and a receiver, configured to receive the operation command execution result which is sent by the gateway and conforms to the return format;

wherein the transmitter is further configured to, in response to the receiver receiving the operation command execution result, send a message for grouping target terminals corresponding to operation command execution results to the gateway according to requirements of a subsequent operation, so that the gateway can group, according to the message for grouping the target terminals corresponding to the operation command execution results, the target terminals corresponding to the operation command execution results.

8. The server according to claim 7, wherein the message for grouping target terminals corresponding to operation command execution is a grouping condition message, wherein the grouping condition message carries a grouping condition for grouping the target terminals corresponding to the operation command execution results, so that the gateway can group the target terminals corresponding to the operation command execution results according to the grouping condition.

9. A gateway, comprising:

a receiver, configured to receive operation information, sent by a server, for performing a management operation on a target terminal, and to receive an operation command execution result, sent by the target terminal;

a transmitter, configured to send an operation command to the target terminal according to the operation information received by the receiver;

a processor; and a computer-readable storage medium storing a program to be executed by the processor, the program including instructions for:

in response to receiving an indication of a return format for the operation command execution result, establishing a node in an Operations subtree of a Fanout subtree of a Fanout Management Object of the gateway, and saving the return format for the operation command execution result in the established node; and processing, according to the indicated return format of the operation command execution result, the operation command execution result received by the receiver, to obtain an operation command execution result conforming to the return format;

wherein the transmitter is further configured to send the operation command execution result conforming to the return format to the server; and wherein the return format for the operation command execution result includes a type limitation and a quantity limitation of the return format.

10. The gateway according to claim 9, wherein:
the receiver is further configured to, after the transmitter sends the operation command execution result conforming to the return format to the server, receive a message, sent by the server, for grouping target terminals corresponding to operation command execution results;
the program further includes instructions for grouping the target terminals corresponding to the operation command execution results according to the message, received by the receiver, for grouping the target terminals corresponding to the operation command execution results; and
the transmitter is further configured to send an execution result of grouping the target terminals corresponding to the operation command execution results to the server.

11. The gateway according to claim 10, wherein:
the receiver is further configured to, after the transmitter sends the operation command execution result conforming to the return format to the server, receive a grouping condition message, sent by the server, for grouping the target terminals corresponding to the operation command execution results, wherein the grouping condition message carries a grouping condition for grouping the target terminals corresponding to the operation command execution results; and
the program further includes instructions for grouping the target terminals corresponding to the operation command execution results according to the grouping condition.

12. The method according to claim 1, wherein the return format includes a type limitation and a quantity limitation.

13. The gateway according to claim 9, wherein the operation command execution results conforming to the return format includes operation command execution results from a plurality of operation commands.

* * * * *